United States Patent [19]
Klein

[11] Patent Number: 5,434,908
[45] Date of Patent: Jul. 18, 1995

[54] GREETING AND SCHEDULE INTEGRATION ARRANGEMENT

[75] Inventor: Robert M. Klein, Golden, Colo.

[73] Assignee: AT&T Corp., Murray Hill, N.J.

[21] Appl. No.: 51,920

[22] Filed: Apr. 22, 1993

[51] Int. Cl.⁶ .............................................. H04M 1/64
[52] U.S. Cl. ...................................... 379/88; 379/67; 379/71; 379/72; 379/89
[58] Field of Search ....................... 379/67, 88, 89, 84, 379/214, 201, 211, 71, 76, 72

[56] References Cited

U.S. PATENT DOCUMENTS

| | | | |
|---|---|---|---|
| 3,794,778 | 2/1974 | Smith et al. | 379/71 |
| 3,974,338 | 8/1976 | Luzier et al. | 379/72 |
| 4,194,196 | 3/1980 | Mohiuddin | 340/711 |
| 4,371,752 | 2/1983 | Matthews et al. | 379/89 |
| 4,581,486 | 4/1986 | Matthews et al. | 379/88 |
| 4,970,669 | 11/1990 | McIntosh et al. | 364/569 |
| 5,008,926 | 4/1991 | Misholi | 379/89 |
| 5,093,854 | 3/1992 | Sucato | 379/67 |
| 5,138,655 | 8/1992 | Takashima et al. | 379/211 |
| 5,276,731 | 1/1994 | Arbel et al. | 379/88 |
| 5,329,578 | 7/1994 | Brennon et al. | 379/67 |

FOREIGN PATENT DOCUMENTS

| | | | |
|---|---|---|---|
| 0029938 | 6/1981 | European Pat. Off. | H04M 3/50 |
| 0215309 | 3/1987 | European Pat. Off. | H04M 3/50 |
| 0455912 | 11/1991 | European Pat. Off. | H04M 3/50 |
| 0510411 | 10/1992 | European Pat. Off. | 379/88 |
| 3732832 | 4/1989 | Germany | 379/214 |
| 60-109363 | 6/1985 | Japan | H04M 3/54 |
| 62-219740 | 9/1987 | Japan | H04M 1/64 |
| 63-104562 | 5/1988 | Japan | H04M 3/42 |
| 0001360 | 1/1989 | Japan | 379/88 |
| 64-001360 | 5/1989 | Japan | H04M 11/00 |
| 02222354 | 9/1990 | Japan | H04M 1/00 |
| 4185147 | 7/1992 | Japan | H04M 3/42 |
| 5153228 | 6/1993 | Japan | 379/214 |

OTHER PUBLICATIONS

U.S. Patent Application, Brunson-Reeder 2-1, Serial No. 07/826,345, "Adjunct Processor Embedded in a Switching System", Filed Jan. 27, 1992.

U.S. Patent Application, G. R. Brunson 4, Serial No. 07/919,674, "Modular Adjunct Processor", Filed Jul. 27, 1992.

Microsoft® Schedule + for Windows TM, Calendaring and Scheduling Program, Microsoft Corporation, 0692 Part No. 098-33912, (1992).

Definity® Audix TM System R1.0, Feature Descriptions, AT&T 585-300-206, Issue 1, Comcode 106710080, (Jul. 1992), pp. 141–155.

Primary Examiner—James L. Dwyer
Assistant Examiner—Scott L. Weaver
Attorney, Agent, or Firm—David Volejnicek

[57] ABSTRACT

An arrangement (FIG. 4) that automatically generates and manages a subscriber's personal greeting for a voice message system (1000), based upon information contained in the subscriber's electronic schedule database (1007), such as a calendar manager program's database, stored in a computer (1002). The arrangement, implemented as a process on the computer, periodically converts information for the present time that is stored in the schedule database into a voicable greeting, using text-to-speech conversion facilities, and sends the greeting to the voice message system for conventional use.

20 Claims, 4 Drawing Sheets

SCHEDULE DATABASE 1007 FOR SUBSCRIBER X

| DATE | TIME | ACTIVITY | DURATION | LOCATION | PRIVATE |
|---|---|---|---|---|---|
| ⋮ | | | | | |
| APRIL 14 1993 | 9:00AM | PRODUCT REVIEW MEETING | 1HR | CONFERENCE ROOM 12 | |
| APRIL 14 1993 | 10:30AM | MEETING WITH ACCOUNTANT | 2HR | ACCOUNTANT'S OFFICE | P |
| ⋮ | | | | | |

DEFAULT GREETING GENERATED AT 10:00 A.M. AND 10:30 A.M.:
"HELLO. YOU HAVE REACHED THE MAILBOX OF ___X___.
I'M NOT AVAILABLE RIGHT NOW. PLEASE LEAVE A MESSAGE AFTER THE TONE."

GREETING GENERATED AT 9:00 A.M.:
"HELLO. YOU HAVE REACHED THE MAILBOX OF ___X___.
I'M AT A PRODUCT REVIEW MEETING IN CONFERENCE ROOM 12 UNTIL 10:00 A.M.
PLEASE LEAVE A MESSAGE AFTER THE TONE."

GREETING AND SCHEDULE INTEGRATION ARRANGEMENT

TECHNICAL FIELD

This invention relates generally to telecommunications and particularly to messaging arrangements, such as voice messaging arrangements.

BACKGROUND OF THE INVENTION

Voice messaging systems, such as the AT&T Audix ® system, typically allow a service subscriber to record one or more messages, referred to as personal greetings, for presentation to callers who are attempting to reach the subscriber, immediately upon a caller becoming connected to the voice messaging system. Many subscribers like to use the personal greeting mechanism as a way to provide information about their whereabouts during the day. The personal greeting can then be used by the caller to locate the subscriber, e.g., for emergency communications or interactions. Alternatively, the personal greeting informs the caller when and where the subscriber will be available for normal contact. But a subscriber's schedule may be such that the personal greeting may need to be changed several times during a day, according to the subscriber's changing schedule. It is very cumbersome and inconvenient to require that the subscriber manually re-record and administer a new personal greeting with such frequency.

SUMMARY OF THE INVENTION

This invention is directed to solving these and other problems and disadvantages of the prior art. Illustratively according to the invention, there is provided an arrangement for the automated generation and management of a subscriber's personal greeting based upon information contained in the subscriber's electronic schedule database (e.g., appointments schedule file, calendar database). Such databases are often already maintained by subscribers for use with one of the many popular and commercially-available calendar-tool application programs. The arrangement accesses the schedule information in the database and uses text-to-speech conversion facilities to generate a personal greeting for the subscriber from this information. The arrangement further periodically re-accesses the schedule information to detect changes therein and uses the information to generate a new, updated, personal greeting for the subscriber.

Generally according to the invention, there is provided an arrangement that integrates an automatic source of user schedule information, such as a user schedule database, with a messaging system having a user personal-greeting capability. The arrangement, illustratively implemented in a processing apparatus such as a computer, automatically generates a user personal greeting from user schedule information obtained from the automatic source. The generated personal greeting is automatically installed in the messaging system, for use of the personal greeting on behalf of the user by the messaging system. Further according to the invention, such an arrangement may be employed in any telecommunications system that presents a user's message to a party who is trying to contact the user through the telecommunications system. The arrangement automatically generates the user's message from the user's schedule information contained in a database. The arrangement then automatically causes the telecommunications system to conventionally present the automatically-generated message.

By administering—creating, removing, changing—the user's personal greeting based on the user's schedule information, the invention ensures that callers who are attempting to reach the user are given up-to-date and accurate information about the present whereabouts of the user. Preferably, the user is given control over the amount of detail presented in the greeting. Yet, by generating the personal greeting automatically, the invention frees the user from the cumbersome and inconvenient necessity of personally, manually, administering and re-recording the personal greeting at every change in the user's schedule.

These and other advantages and features of the invention will become more apparent from the following description of an illustrative embodiment of the invention considered together with the drawing.

DETAILED DESCRIPTION

Figure 1:
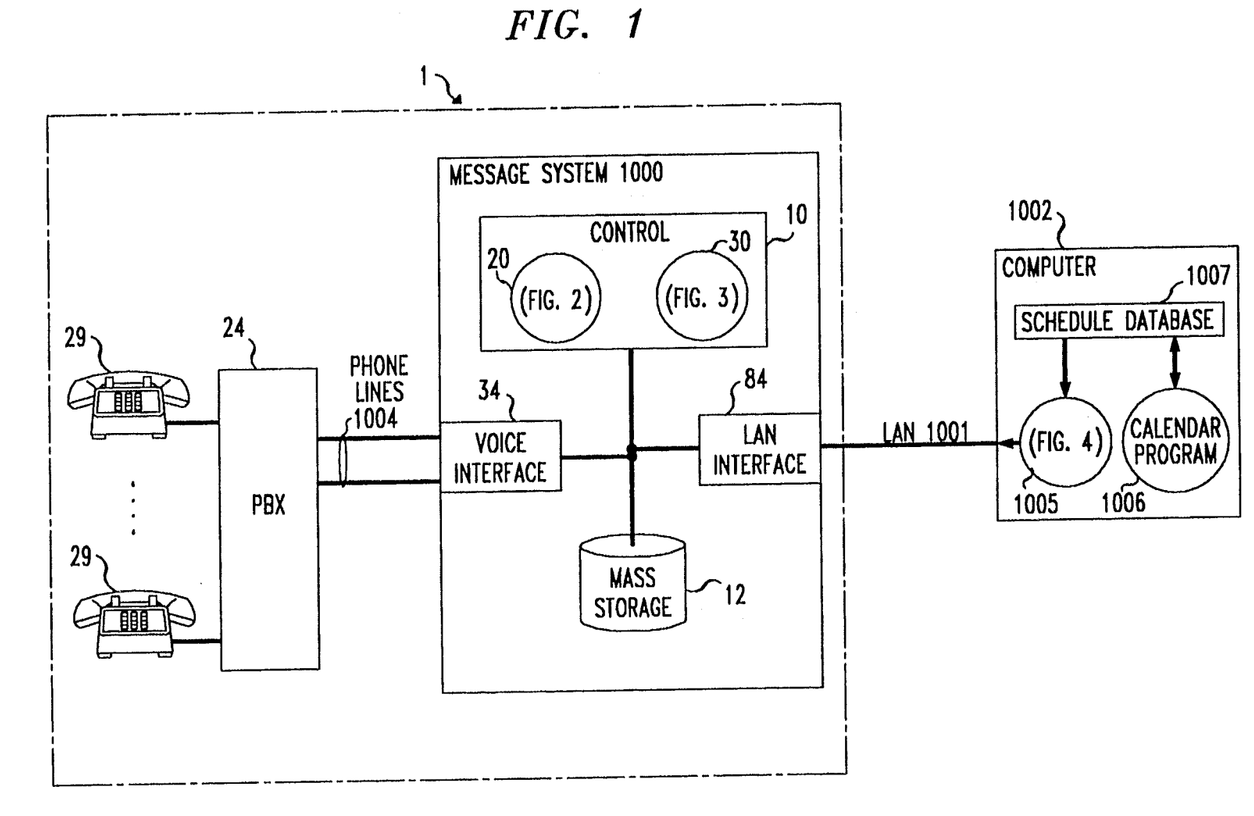
FIG. 1 is a block diagram of a telecommunications system embodying an illustrative example of the invention.

FIG. 1 shows an illustrative telecommunications system. It comprises user telephone terminals 29 connected by a private branch exchange switch (PBX) 24 to a message system 1000. Message system 1000 typically provides messaging services on a subscription basis. Hence, users thereof will be referred to hereinbelow as subscribers. Message system 1000 stores voice messages for subscribers in a mass storage 12, such as a disk, operating under control of a controller 10. Terminals 29 access message system 1000 through PBX 24 over phone lines 1004 and a voice interface 34 that interfaces phone lines 1004 to the internal circuits and functions of message system 1000, to store the messages in system 1000 and to retrieve the messages from system 1000. Message system 1000 is illustratively the AT&T Ovation multimedia communication system, or an AT&T voice-mail system of the type disclosed in the application of G. R. Brunson and R. D. Reeder entitled "Adjunct Processor Embedded in a Switching System", Ser. No. 07/826,345, filed Jan. 27, 1992, now issued as U.S. Pat. No. 5,311,576 or in the application of G. R. Brunson entitled "Modular Adjunct Processor Made of Identical Multi-Function Modules Each Innately Unable to Perform the Adjunct-Processor Functions But Adaptable Under Direction Of One Of Them To Perform Any Of The Adjunct-Processor Functions", Ser. No. 07/919,674, filed Jul. 27, 1992, now issued as U.S. Pat. No. 4,329,579 both of which are assigned to the same assignee as this application. Alternatively, portion 1 of the system of FIG. 1 which includes terminals 29, PBX 24, and message system 1000, is illustratively the store-and-forward system disclosed in U.S. Pat. No. 5,008,926, which is hereby incorporated herein by reference.

Message system 1000 is connected by a local area network (LAN) 1001 to a computer 1002. LAN 1001 is interfaced to the internal circuits and functions of message system 1000 by a LAN interface 84, in a conventional manner such as is disclosed in the above-referenced U.S. Pat. No. 5,008,926. Data transfers between computer 1002 and message system 1000 over LAN 1001 are performed by means of an applications programmer interface (API) program communicating by means of a utility such as transfer control protocol/Internet protocol (TCP/IP) remote procedure call (RPC) server function using LAN interface 84.

Figure 2:
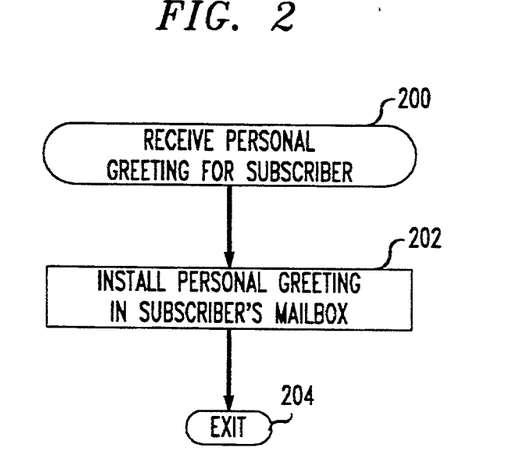
FIG. 2 is a flow diagram of a personal greeting installation function of the message system of the telecommunications system of FIG. 1.
Figure 3:
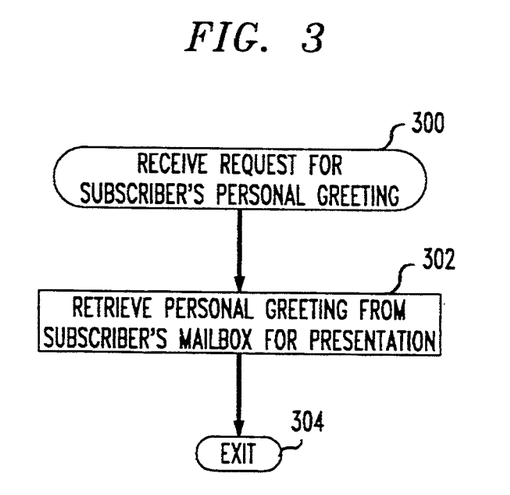
FIG. 3 is a flow diagram of a personal greeting presentation function of the message system of the telecommunications system of FIG. 1.

The operations of control 10 engaged in with respect to a subscriber's personal greeting are conventional and are merely summarized in FIGS. 2–3. Conventionally, voice interface 34 interacts with the subscriber to record a message that serves as a personal greeting, and then conveys the electronic file containing the greeting to control 10. Control 10 receives the file, at step 200, and uses it to install the subscriber's personal greeting in that subscriber's personal mailbox in mass storage 12, at step 202. Control 10 then exits, at step 204. When the subscriber calls system 1000 to review his or her multiple personal greetings, or when a call for the subscriber is directed to system 1000 and one of the subscriber's personal greetings is activated, voice interface 34 requests the subscriber's activated personal greeting. Control 10 receives this request, at step 300, and in response retrieves the personal greeting from the subscriber's mailbox in mass storage 12 and presents it to voice interface 34 for play-back to the caller, at step 302. Control 10 then exits, at step 304.

Figure 5:
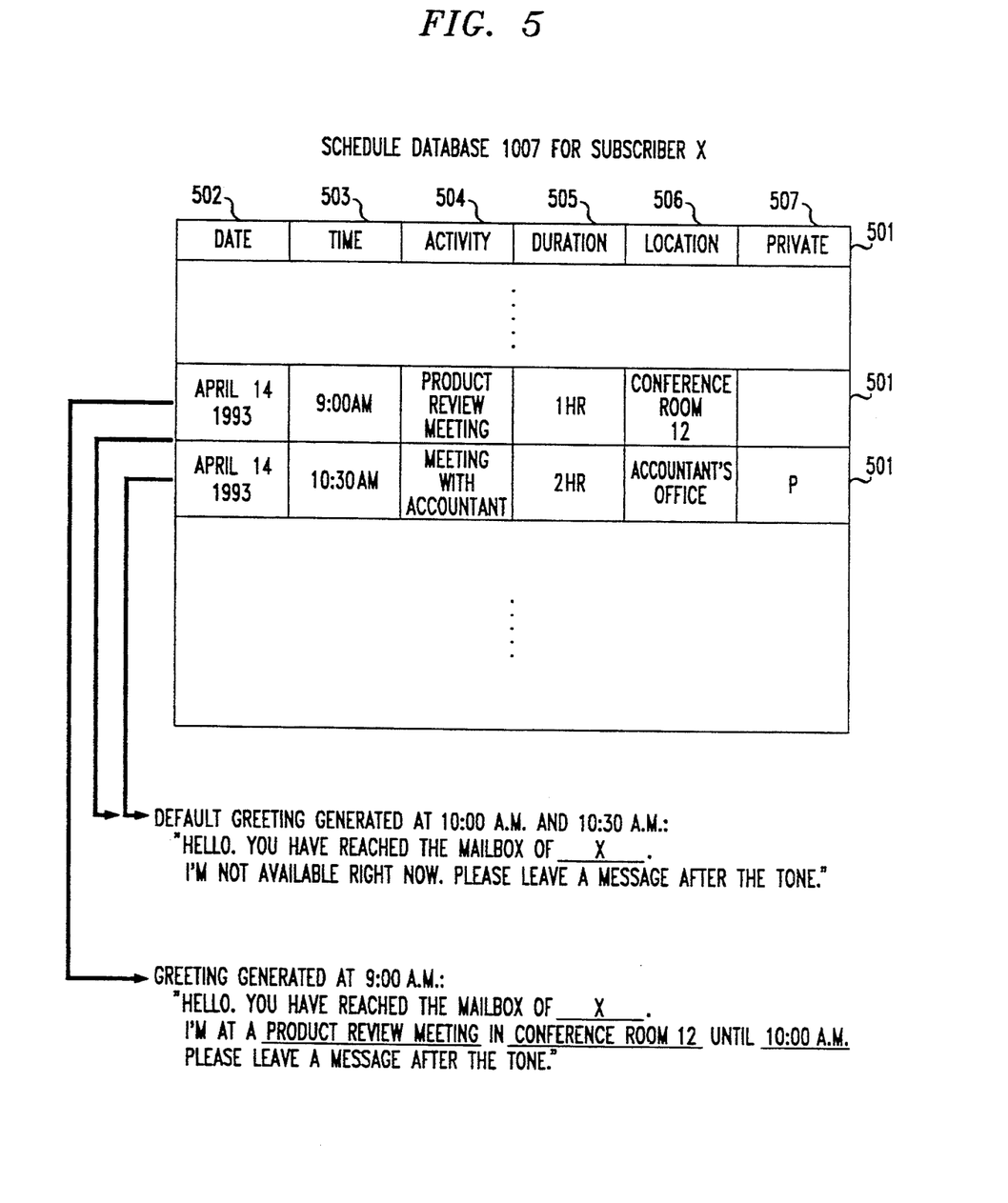
FIG. 5 is a block diagram of a schedule database of the computer of the telecommunications system of FIG. 1 and an example of personal greetings generated therefrom by the function of FIG. 4.

Computer 1002 includes an automatic source of a subscriber's schedule information, such as a schedule database 1007 which contains the subscriber's schedule information in electronic form. Schedule database 1007 may be just an ASCII file of appointment information that is created by the subscriber and that is selectively editable by an on-line editor. Preferably, however, schedule database 1007 is a calendar database that is associated with and created by a conventional calendar program 1006 of the subscriber. Examples of conventional calendar programs include Calendar-Manager software tool of Sun Microsystems, and Schedule+calendaring and scheduling software of Microsoft Corporation. An example of such a database is shown in FIG. 5. Schedule database 1007 includes entries 501 carrying information fields such as date 502, time 503, activity 504, duration 505, location 506, and a flag 507 indicating whether the corresponding entry's information is public or private.

According to the invention, computer 1002 further includes a function, illustratively implemented as a process 1005, that uses information contained in a subscriber's schedule database 1007 to create a personal greeting for the subscriber for use by message system 1000. The program of process 1005 is stored in a memory of computer 1002 and is executed therefrom by a processing unit of computer 1002, as is conventional for processes. The functionality of process 1005 is flowcharted in FIG. 4. When execution of process 1005 is commenced, at step 400, process 1005 first obtains an indication of present date and time from computer 1002, at step 401. Process 1005 then accesses information for the present date and time in schedule database 1007 of subscriber X who is served by process 1005, at step 402. If there is no entry 501 for the present time in schedule database 1007, or if the entry 501 for the present time is blank, as determined at step 404, process 1005 instructs message system 1000 to use a default greeting (a generic, non-specific, form of a personal greeting) for subscriber X, at step 407. Illustratively, the default greeting is as follows: "Hello, you have reached the mailbox of X. I'm not available right now. Please leave a message after the tone."

Figure 4:
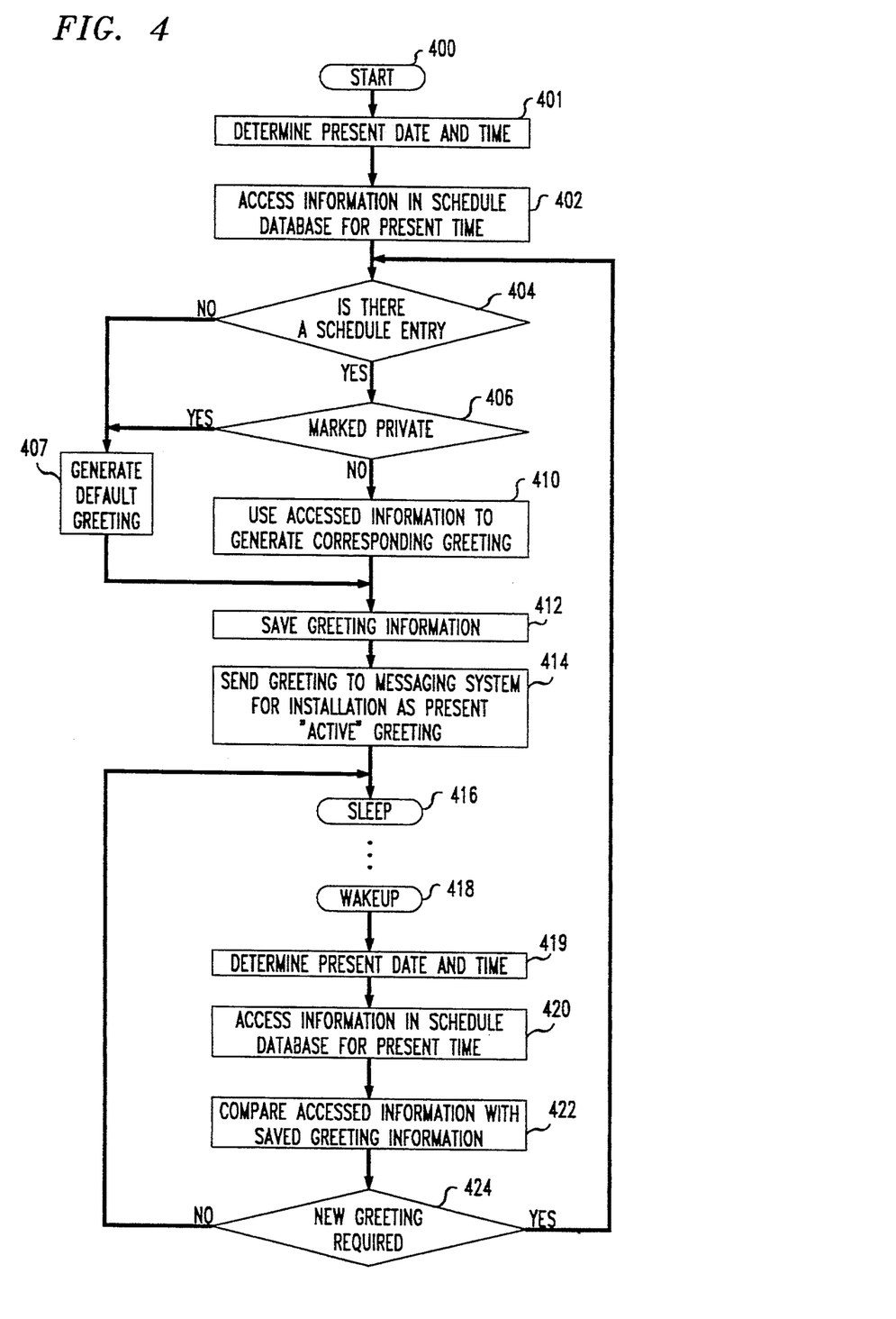
FIG. 4 is a flow diagram of a personal greeting generation function of the computer of the telecommunications system of FIG. 1.

If there is a non-blank entry 501 in schedule database 1007 for the present time, as determined at step 404, process 1005 checks whether private flag 507 of that entry 501 is set, at step 406. If flag 507 is set, indicating that the information in that entry 501 is private, process 1005 instructs message system 1000 to use the default greeting for subscriber X, at step 408. If flag 507 is not set, process 1005 uses the information contained in the entry 501 for the present time to generate a corresponding present-time personal greeting for subscriber X, at step 410. Process 1005 creates the greeting as an electronic file in voicable form, e.g., PCM or CELP, using conventional text-to-speech conversion technology. Illustratively, process 1005 may employ the services of a Creative Labs' Sound Blaster text-to-speech board and application software for this purpose. Illustratively, the form of the personal greeting is as follows: "Hello. You have reached the mailbox of X. I'm at activity in location until duration. Please leave a message after the tone." The underlined terms in the message are variables for which process 1005 substitutes information based on contents of the corresponding fields of the entry 501 for the present time. An illustrative example of such a personal greeting is shown in FIG. 5.

Following step 407 or 410, process 1005 saves either a full copy of the generated greeting or a copy of the variable information contained therein, at step 412, and conveys the greeting to message system 1000 via LAN 1001 for installation as the present "active" greeting, at step 414. Message system 1000 responds thereto by installing the received greeting as the "active" personal greeting, in the manner shown in FIG. 2. Message system 1000 then presents this greeting to callers who are trying to reach subscriber X, in the manner shown in FIG. 3, until the greeting is replaced by a new personal greeting.

Following step 414, process 1005 that is serving a single subscriber goes to sleep for a predetermined period of time, at step 416. Alternatively, if process 1005 is serving a plurality of subscribers, process 1005 repeats steps 401–414 for each served subscriber prior to going to sleep at step 416. The sleep period is an administrable function, programmed either by the subscriber or by an administrator of computer 1002.i The period of sleep is normally dictated by the granularity of the schedule information in schedule database 1007. In other words, if schedule database 1007 may contain a different entry 501 for each 5-minute period or time interval, process 1005 will sleep for 5 minutes, but if schedule database 1007 may contain a different entry 501 only for each 30-minute period, process 1005 will sleep for 30 minutes.

When the sleep period expires, process 1005 is awakened by computer 1002, at step 418. Process 1005 again obtains an indication of present date and time from computer 1002, at step 419, and then accesses information for the present time in schedule database 1007 of subscriber X who is served by process 1005, at step 420. Process 1005 then compares the accessed information with the information that it had saved for subscriber X at step 412, at step 422. If the comparison indicates, at step 424, that no change in the personal greeting is required because the old personal greeting is still timely, process 1005 merely returns to sleep at step 416. If it is determined at step 424 that a new personal greeting is required, process 1005 returns to step 404 to generate the new greeting. Alternatively, if process 1005 is serving a plurality of subscribers, process 1005 repeats steps 419–424 and, if needed, steps 404–414, for each served subscriber, prior to returning to sleep at step 416.

The attached appendix contains a listing of an illustrative example of C-program code that implements the personal greeting generation function described above.

Of course, various changes and modifications to the illustrative embodiment described above will be apparent to those skilled in the art. For example, instead of using text-to-speech conversion facilities, the greeting generation process may include a database of recorded speech fragments which it may assemble in strings to form the personal greetings. Also, the personal greeting need not be generated merely as a function of the schedule information, but may be generated as a function of a matrix of additional types of information, such as the location or identity of the caller, a caller-provided access code, time-of-day, weekday/weekend, etc. The capability of the invention may also be integrated with other tools and capabilities, e.g., setting off an alarm to notify the subscriber that it is time for a scheduled appointment. Furthermore, the generated personal greeting message may also indicate when the subscriber will be available, e.g., "Hello, you have reached the voice mailbox of X. Presently, I am at place until time. I will be available at this extension from time until time and from time until time." The information is derived from an analysis of the schedule data. Such changes and modifications can be made without departing from the spirit and the scope of the invention and without diminishing its attendant advantages. It is therefore intended that such changes and modifications be covered by the following claims.

APPENDIX

```
/*   mgr.c:    AUDIX personal greeting manager process

Usage:    grtg_mgr <schedule_filename> <extension> <update_frequency> where schedule_filename is the pathname of the ascii file containing the users personal schedule extension is the subscriber's extension on AUDIX update_frequency is the number of minutes between personal greeting updates

* Note that the process will interactively query the subscriber for the AUDIX password so that the password will not show up if someone does a ps(1) on the host computer system

*/ include <stdio.h> include <signal.h> include "audix_int.h"

extern char *getenv();

extern char *ctime();

/* subscriber provided parameters */ static char *extension = "";

static char username[32] = "";

static char password[20] = "";

static char *schedule_filename = "";

static int update_frequency = -1;
```

```c
static char *audix_server = "";
static long access_key = 0;
static char greeting_file[32] = "";
static
void
catch_a_signal ( signal_nbr )
int signal_nbr;
{
    short greeting_map[3];
    /* restore greeting map to use system default greeting */
    greeting_map[0] = 0;
    greeting_map[1] = 0;
    greeting_map[2] = 0;
    if (access_key > 0) {
        audix_update_greeting_map(access_key,CT_ALLCALLS,greeting_map);
        audix_logout(access_key);
    }
    else {
        access_key = audix_login(extension,password);
        if (access_key > 0) {
            audix_update_greeting_map(access_key,CT_ALLCALLS,greeting_map);
            audix_logout(access_key);
        };
    };
    audix_disconnect(audix_server);
    if (greeting_file[0] != '\0')
        unlink(greeting_file);
    exit(0);
}
static
char *
default_greeting_string ( )
{
    static char default_greeting[512];
    sprintf(default_greeting,
    "Hello, you have reached the audix voice mailbox for extension %c %c %c %c %c.
    %s is currently not available. If you wish to leave a message please reecord at the tone,
    otherwise please disconnect now.",
        extension[0],extension[1],extension[2],extension[3],extension[4],username);
    return(default_greeting);
}
```

```
static
char *
greeting_string ( description, start_time, stop_time )
char *description;
int start_time;
int stop_time;
{
    char start_time_string[20];
    char stop_time_string[20];
    int hour, minute;
static char greeting[512];
/* create start and stop time strings */
hour = start_time/60;
minute = start_time - (hour*60);
if (hour > 12) {
    hour -= 12;
    if (minute == 0)
        sprintf(start_time_string,"%d p m ",hour);
    else
        sprintf(start_time_string,"%d %d p m ",hour,minute);
    }
else {
    if (minute == 0)
        sprintf(start_time_string,"%d a m ",hour);
    else
        sprintf(start_time_string,"%d %d a m ",hour,minute);
    };
hour = stop_time/60;
minute = stop_time - (hour*60);
if (hour > 12) {
    hour -= 12;
    if (minute == 0)
        sprintf(stop_time_string,"%d p m ",hour);
    else
        sprintf(stop_time_string,"%d %d p m ",hour,minute);
    }
else {
    if (minute == 0)
        sprintf(stop_time_string,"%d a m ",hour);
    else
        sprintf(stop_time_string,"%d %d a m ",hour,minute);
```

```c
    };
    /* do not relay information marked as "Private" (with P: preceding the description) */
    if ((description[0] == 'P') && (description[1] == ':'))
      sprintf(greeting,
        "Hello, you have reached the audix voice mailbox for extension %c %c %c %c %c. %s is
            currently not available between %s and %s. If you wish to leave a message please
            reecord at the tone, otherwise please disconnect now.",
          extension[0],extension[1],extension[2],extension[3],extension[4],
          username,start_time_string,stop_time_string);
    else
      sprintf(greeting,
        "Hello, you have reached the audix voice mailbox for extension %c %c %c %c %c. %s is
            currently at %s between %s and %s. If you wish to leave a message please
            reecord at the tone, otherwise please disconnect now.",
          extension[0],extension[1],extension[2],extension[3],extension[4],
          username,description,start_time_string,stop_time_string);
    return(greeting);
}
static
char *
generate_greeting_text ( schedule_file, month, day, year, minute )
char *schedule_file;
int month;
int day;
int year;
int minute;
{
    char cookie[6];
    FILE *schedule;
    int schedule_month, schedule_day, schedule_year;
    int start_hour, start_minute;
    int stop_hour, stop_minute;
    char description[256];
    schedule = fopen(schedule_file,"r");
    if (schedule == NULL)
        return(default_greeting_string());
    if ((fscanf(schedule,"%s\n",cookie) != 1)||
        (strncmp(cookie,"AUDIX",6) != 0)) {
      fclose(schedule);
      return(default_greeting_string());
    };
```

```c
/* search the schedule file for an event covered by the current time */
while (fscanf(schedule,"%d/%d/%d %d:%d-%d:%d %[^\n]\n",
        &schedule_month,&schedule_day,&schedule_year,
        &start_hour,&start_minute,&stop_hour,&stop_minute,
        description) == 8) {
    /* is the current time covered by the schedule item time period? */
    if ((schedule_month == month) &&
        (schedule_day == day) &&
        (schedule_year == year)) {
        int start_time, stop_time;
        start_time = start_hour*60 + start_minute;
        stop_time = stop_hour*60 + stop_minute;
        if ((minute >= start_time) && (minute <= stop_time)) {
            fclose(schedule);
            return(greeting_string(description,start_time,stop_time));
        };
    };
};
fclose(schedule);
return(default_greeting_string());
}
main ( argc, argv )
int argc;
char *argv[];
{
    char cookie[6];
    FILE *schedule;
    short greeting_map[3];
    struct SUBSCRIBER_PROFILE *profile_ptr;
    char current_greeting[512];
    /* text of current greeting or NULL if system default */
    if (argc != 4) {
        fprintf(stderr,"Usage: grtg_mgr <schedule_filename> <extension> <update_frequency>\n");
        exit(1);
    };
    /* verify the existence of the audix_server environment variable */
    audix_server = getenv("AUDIX_SERVER");
    if (audix_server == NULL) {
        fprintf(stderr,"grtg_mgr: you must specify AUDIX_SERVER environment variable\n");
```

```
        exit(1);
    };
    /* fetch and validate subscriber provide parameters */
    schedule_filename = argv[1];
    extension = argv[2];
    sscanf(argv[3],"%d",&update_frequency);
    strncpy(password,getpass("Enter AUDIX subscriber password >>"),sizeof(password));
    /* verify existence of schedule filename */
    schedule = fopen(schedule_filename,"r");
    if (schedule == NULL) {
        fprintf(stderr,"grtg_mgr: canot open schedule <%s>\n",
            schedule_filename);
        exit(1);
    };
    /* verify validity of schedule file by checking magic cookie */
    if ((fscanf(schedule,"%s\n",cookie) != 1) ||
       (strncmp(cookie,"AUDIX",6) != 0)) {
        fprintf(stderr,"grtg_mgr: Invalid format for schedule file <%s>\n",
            schedule_filename);
        exit(1);
    };
    fclose(schedule);
    /* verify validity of update_frequency and reset if out of range */
    if (update_frequency <= 0)
        update_frequency = 15;
    if (update_frequency > 60)
        update_frequency = 60;
    signal(SIGHUP,catch_a_signal);
    signal(SIGINT,catch_a_signal);
    signal(SIGQUIT,catch_a_signal);
    signal(SIGTERM,catch_a_signal);
    /* verify correctness of provided extension and password */
    if (audix_connect(audix_server) < 0) {
        fprintf(stderr,"grtg_mgr: cannot connect to AUDIX SERVER '%s'\n",
            audix_server);
        exit(1);
    };
login_once_again:
    access_key = audix_login(extension,password);
    if (access_key == ERR_LOGIN_EXISTS) {
        sleep(10);
```

```
        goto login_once_again;
    };
if (access_key <= 0) {
    fprintf(stderr,"grtg_mgr: Cannot login to subscriber mailbox on extension %s\n",
            extension);
    exit(1);
};
profile_ptr = audix_get_subscriber_profile(access_key,
            audix_get_subscriber_id_ext(access_key,extension));
if (profile_ptr != NULL)
    strncpy(username,profile_ptr->username,32);
else
    strncpy(username,"subscriber",32);
/* report to the user and start management of personal greetings */
fprintf(stdout,"\nManagement of personal greetings on extension %s for %s",
        extension,username);
fprintf(stdout,"\nwill be based on personal schedule data in file '%s'",
        schedule_filename);
fprintf(stdout,"\nupdates will occur every %d minutes\n",
        update_frequency);
/* put this process in the background so it runs as a daemon */
setpgrp(0,0);
close(0);
close(1);
close(2);
if (fork())
    exit(0);
/* set up personal greeting map so that all calls are answered by
   the system default greeting initially, this program assumes that
   greeting number 9 will be used as the generated greeting. */
greeting_map[0] = 0;
greeting_map[1] = 0;
greeting_map[2] = 0;
audix_update_greeting_map(access_key,CT_ALLCALLS,greeting_map);
current_greeting[0] = '\0'; /* initialize current greeting */
audix_logout(access_key);
access_key = 0;
/* loop forever until explicitly interrupted */
while (1) {
    long current_time;
    char *new_greeting;
```

```c
char *time_string;
int month, day, year, minute;
int i;
/* get time and convert to month/day/year/minute format */
time(¤t_time);
time_string = ctime(&current_time);
if (strncmp(&time_string[4],"Jan",3) == 0)
    month = 1;
else if (strncmp(&time_string[4],"Feb",3) == 0)
    month = 2;
else if (strncmp(&time_string[4],"Mar",3) == 0)
    month = 3;
else if (strncmp(&time_string[4],"Apr",3) == 0)
    month = 4;
else if (strncmp(&time_string[4],"May",3) == 0)
    month = 5;
else if (strncmp(&time_string[4],"Jun",3) == 0)
    month = 6;
else if (strncmp(&time_string[4],"Jul",3) == 0)
    month = 7;
else if (strncmp(&time_string[4],"Aug",3) == 0)
    month = 8;
else if (strncmp(&time_string[4],"Sep",3) == 0)
    month = 9;
else if (strncmp(&time_string[4],"Oct",3) == 0)
    month = 10;
else if (strncmp(&time_string[4],"Nov",3) == 0)
    month = 11;
else if (strncmp(&time_string[4],"Dec",3) == 0)
    month = 12;
sscanf(&time_string[8],"%d",&day);
sscanf(&time_string[20],"%d",&year);
year -= 1900;
sscanf(&time_string[11],"%d",&i);
minute = i*60;
sscanf(&time_string[14],"%d",&i);
minute += i;
new_greeting = generate_greeting_text(schedule_filename,month,day,year,minute);
if (strncmp(new_greeting,current_greeting,512) != 0) {
    char convert_cmd[256];
    FILE *input_pipe;
```

```c
      if (access_key <= 0) {
      login_again:
        access_key = audix_login(extension,password);
        if (access_key == ERR_LOGIN_EXISTS) {
          sleep(10);
          goto login_again;
        };
        if (access_key <= 0) {
          audix_disconnect(audix_server);
          exit(1);
        };
      };
      /* save new greeting text */
      strncpy(current_greeting,new_greeting,512);
      /* install new greeting after converting to speech */
      sprintf(greeting_file,"/tmp/grtg_mgr%d",getpid());
      sprintf(convert_cmd,
      "express -U -i -A1 - 2>/dev/null | rctopcm -8 -f8000 2>/dev/null > %s",
      greeting_file);
      input_pipe = popen(convert_cmd,"w");
      fwrite(current_greeting,strlen(current_greeting),1,input_pipe);
      pclose(input_pipe);
      audix_delete_greeting(access_key,9);
      if (audix_install_greeting(access_key,greeting_file,9,IMULAW8) >= 0)
          greeting_map[0] = 9;
        else
          greeting_map[0] = 0;
        audix_update_greeting_map(access_key,CT_ALLCALLS,greeting_map);
        unlink(greeting_file);
        greeting_file[0] = '\0';
      };
      if (access_key > 0) {
        audix_logout(access_key);
        access_key = 0;
      };
      sleep(update_frequency*60);
    };
}
```

I claim:

1. An apparatus comprising:
a messaging system having a personal greeting capability such that the messaging system stores a greeting from a called party, and retrieves and presents the stored greeting to a calling party;

a source of called-party schedule information automatically indicating time periods and schedule entries of the called party for the indicated time periods; and processing means for automatically end responsive to a schedule entry for a time period in the called-party schedule information obtained from the source, a personal greeting from the called party, for use by the messaging system during the time period, from the called-party schedule information obtained from the source;

the messaging system being responsive to the generating by installing the generated personal greeting, and further responsive to calls during the time period by retrieving and presenting the generated personal greeting to calling parties who call during the time period.

2. The apparatus of claim 1 wherein the messaging system comprises:

controller means for automatically installing the generated personal greeting in the messaging system for use by the messaging system throughout the time period.

3. An apparatus for use with a messaging system having a personal greeting capability such that the messaging system stores a greeting from a called party, and retrieves and presents the stored greeting to a calling party, and further for use with a source of called-party schedule information automatically indicating time periods and schedule entries of the called party for the indicated time periods, comprising:

processing means for automatically generating, responsive to a schedule entry for a time period in the called-party schedule information obtained from the source, a personal greeting from the called party for use by the messaging system during the time period, from the called-party schedule information obtained from the source; and means for automatically conveying the generated personal greeting to the messaging system for installation, and for subsequent retrieval and presentation of the generated personal greeting by the messaging system to calling parties who call during the time period.

4. The apparatus of claim 3 further comprising:

controller means for automatically installing the generated personal greeting in the messaging system for use by the messaging system throughout the time period.

5. An apparatus comprising:

a telecommunications system that retrieves and presents a stored message from the called party to a calling party who is trying to contact the called party through the telecommunications system;

a database containing information that defines a schedule of the called party by indicating time periods and schedule entries of the called party for the indicated time periods;

processing means for automatically generating, responsive to information contained in the database that defines a schedule entry for a time period in the schedule of the called party, the message from the called party, from the information contained in the database; and means for automatically causing the telecommunications system to store the automatically generated message from the called party;

the telecommunications system being responsive to calling parties who try to contact the called party during the time period by retrieving and presenting the stored generated message from the called party to said calling parties.

6. The apparatus of claim 5 wherein the telecommunications system comprises a messaging system; and the stored generated message from the called party comprises a personal greeting from the called party.

7. The apparatus of claim 5 wherein:

the processing means comprise means for obtaining from the database at predetermined time intervals any information that defines the schedule of the called party for a present time interval relative to the obtaining, means responsive to obtaining no information that defines the schedule of the called party for the present time interval, for automatically generating a default message, and means responsive to obtaining information that defines the schedule of the called party for the present time interval, for automatically generating a present message including the obtained information; and the means for causing cause the telecommunications system to store, and then to retrieve and present the automatically generated default or present message to said calling parties who try to contact the called party during the present time interval.

8. The apparatus of claim 7 wherein:

the means for automatically generating a present message comprise means responsive to obtaining the information that defines the schedule of the called party for the present time interval, for determining whether the obtained information is designated as private to the called party, means responsive to a determination that the obtained information is designated as private, for automatically generating the default message, and means responsive to a determination that the obtained information is not designated as private, for automatically generating the present message including the obtained information.

9. The apparatus of claim 5 wherein:

the processing means comprise means for obtaining from the database at predetermined time intervals any information that defines the schedule of the called party for a present time interval relative to the obtaining, means responsive to each periodic obtainment, for analyzing any obtained information to determine whether a message of the called party that is being presented by the telecommunications system should change, means responsive to both (a) a determination that the message of the called party that is being presented by the telecommunications system should change and (b) obtaining no information that defines the schedule of the called party for the present time interval, for automatically generating a default message, means responsive to both (a) a determination that the message of the called party that is being presented by the telecommunications system should change and (c) obtaining information that defines the schedule of the called party for the present time interval, for automatically generating a present message including the obtained information; and the means for automatically causing respond to each generating of a default or present message by causing the communications system to store, and then to retrieve and present the generated default or present message to said calling parties who try to contact the called party during the present time interval.

10. An apparatus for use with a telecommunications system that retrieves and presents a stored message from the called to a calling party who is trying to contact the called party through the telecommunications system, and further for use with a database containing information that defines a schedule of the called party by indicating time periods and schedule entries of the called party for the indicated time periods, comprising:

processing means for automatically generating, responsive to information contained in the database that defines a schedule entry for a time period in the schedule of the called party, the message from the called party, from the information contained in the database; and means for automatically causing the telecommunications system to store the automatically generated message from the called party for subsequent retrieval and presentation of the stored generated message from the called party by the telecommunications system to calling parties who try to contact the called party during the time period.

11. The apparatus of claim 10 wherein:

the processing means comprise means for obtaining from the database at predetermined time intervals any information that defines the schedule of the called party for a present time interval relative to the obtaining, means responsive to obtaining no information that defines the schedule of the called party for the present time interval, for automatically generating a default message, and means responsive to obtaining information that defines the schedule of the called party for the present time interval, for automatically generating a present message including tile obtained information; and the means for causing cause the telecommunications system to store, and then to retrieve and present the automatically generated default or present message to said calling parties who try to contact the called party during the present time interval.

12. The apparatus of claim 11 wherein:

the means for automatically generating the present message including the obtained information comprise means responsive to obtaining the information that defines the schedule of the called party for the present time interval, for determining whether the obtained information is designated as private to the called party, means responsive to a determination that the obtained information is designated as private, for automatically generating the default message, and means responsive to a determination that the obtained information is not designated as private, for automatically generating the present message including the obtained information.

13. The apparatus of claim 10 wherein:

the processing means comprise means for obtaining from the database at predetermined time intervals any information that defines the schedule of the called party for a present time interval relative to the obtaining, means responsive to each obtainment, for analyzing any obtained information to determine whether a message of the called party that is being presented by the telecommunications system should change, means responsive to both (a) a determination that the message of the called party that is being presented by the telecommunications system should change and (b) obtaining no information that defines the schedule of the called party for the present time interval, for automatically generating a default message, means responsive to both (a) a determination that the message from the called party that is being presented by the telecommunications system should change and (c) obtaining information that defines the schedule of the called party for the present time interval, for automatically generating a present message including the obtained information; and the means for automatically causing respond to each generating of a default or present message by causing the communications system to store, and then to retrieve and present the generated default or present message to said calling parties who try to contact the called party during the present time interval.

14. A method of providing a called party's personal greeting to a messaging system having a personal greeting capability such that the messaging system stores a greeting from a called party, and retrieves and presents the stored greeting to a calling party, comprising the steps of:

automatically obtaining called-party schedule information from a source of called-party schedule information automatically indicating time periods and schedule entries of the called party for the indicated time periods;

in response to a schedule entry for a time period in the called-party schedule information obtained from the source, automatically generating a personal greeting from the called party, from the obtained called-party schedule information; and automatically conveying the generated personal greeting to the messaging system;

the messaging system being responsive to the conveying by installing the generated personal greeting as the personal greeting from the called party; and the messaging system further being responsive to calls during the time period by retrieving and presenting generated personal greeting to calling parties who call during the time period.

15. The method of claim 14 wherein the step of installing comprises the step of a controller of the messaging system automatically installing the generated personal greeting in the messaging system for use by the messaging system throughout the time period.

16. A method of providing a message from a called party to a telecommunications system that retrieves and presents a stored said message from the called party to a calling party who is trying to contact the called party through the telecommunications system, comprising the steps of:

automatically obtaining, from a database, information that defines a schedule of the called party by indicating time periods and schedule entries of the called party for the indicated time periods;

in response to information obtained from the database that defines a schedule entry for a time period in the schedule of the called party, automatically generating a message from the called party, from the obtained information;

automatically causing the telecommunications system to store the automatically generated message from the called party; and     in response to calling parties trying to contact the called party during the time period, the telecommunications system retrieving and presenting the stored automatically generated message from the called party to said calling parties.

17. The method of claim 16 wherein
the telecommunications system comprises a messaging system, and the stored automatically generated message from the called party comprises a personal greeting from the called party.

18. The method of claim 16 wherein:
the step of obtaining information comprises the step of obtaining from the database at predetermined time intervals any information that defines the schedule of the called party for a present time interval relative to the obtaining;

the step of automatically generating comprises the steps of in response to obtaining no information that defines the schedule of the called party for the present time interval, automatically generating a default message, and in response to obtaining the information that defines the schedule of the called party for the present time interval, automatically generating a present message including the obtained information; and the step of automatically causing comprises the step of automatically causing the telecommunications system to store, and then to retrieve and present the automatically generated default or present message to said calling parties who try to contact the called party during the present time interval.

19. The method of claim 18 wherein:
the step of automatically generating the present message including the obtained information comprises the steps of in response to obtaining information that defines the schedule of the called party for the present time interval, determining whether the obtained information is designated as private to the called party, in response to a determination that the obtained information is designated as private, automatically generating the default message, and in response to a determination that the obtained information is not designated as private, automatically generating the present message including the obtained information.

20. The method of claim 16 wherein:
the step of obtaining information comprises the steps of obtaining from the database any information that defines the schedule of the called party for a present time interval relative to the obtaining, and repeating at predetermined time intervals the step of obtaining from the database any information that defines the schedule of the called party for a present time interval relative to the obtaining;

the step of automatically generating comprises the steps of in response to each step of obtaining front the database any information that defines the schedule of the called party for a present time interval, analyzing any obtained information to determine whether a message of the called party that is being presented by the telecommunications system should change, in response to both (a) a determination that the message of the called party that is being presented by the telecommunications system should change and (b) obtaining no information that defines the schedule of the called party for the present time interval, automatically generating a default message, in response to both (a) a determination that the message of the called party that is being presented by the telecommunications system should change and (c) obtaining information that defines the schedule of the called party for the present time interval, automatically generating a present message including the obtained information; and the step of automatically causing comprises the step of in response to each step of generating, causing the telecommunications system to store, and then to retrieve and present the generated default or present message to said calling parties who try to contact the called party during the present time interval.

* * * * *